United States Patent [19]

Winey et al.

[11] Patent Number: 5,410,420

[45] Date of Patent: Apr. 25, 1995

[54] DRUM SCANNER FOCUSING SYSTEM

[76] Inventors: Calvin M. Winey, 33 Heald Rd., Carlisle, Mass. 01741; Laurier St. Onge, 4 Coleman Pl., Londonderry, N.H. 03053

[21] Appl. No.: 48,411

[22] Filed: Apr. 14, 1993

[51] Int. Cl.$^6$ .............................. G03F 3/08; G01J 1/20
[52] U.S. Cl. .................... 358/484; 358/489; 358/490; 358/493; 250/201.2
[58] Field of Search ............... 250/201.2, 201.7, 201.8; 358/489, 490, 493, 496, 474; 348/51

[56] References Cited

U.S. PATENT DOCUMENTS 4,272,187  6/1981  Birdsall et al. ................... 355/56
4,458,145  7/1984  Voles .............................. 250/204
4,717,959  1/1988  Isago ............................... 358/227
4,996,605  2/1991  Taniguchi ......................... 358/474

FOREIGN PATENT DOCUMENTS 0268246  11/1987  European Pat. Off. .

Primary Examiner—Edward L. Coles, Sr.
Assistant Examiner—John Ning

[57]  ABSTRACT

A focusing system for the optical head of a rotary drum scanner establishes focus quickly and automatically by iteratively scanning a line of a document on the drum and repeatedly adjusting the focus of the head in accordance with a focus optimizing function until the region of optimal focus is found.

7 Claims, 2 Drawing Sheets

DRUM SCANNER FOCUSING SYSTEM

BACKGROUND OF THE INVENTION

A. Field of The Invention

The invention relates to scanners for providing a digitized image of a document and, more particularly, to a focusing system for automatically focusing the optical head of a drum scanner.

B. Prior Art

Rotary scanners mount an image source such as a document or film on a drum for scanning by an optical scanning head. Relative rotational and translational motion between the drum and the head is provided to form successive scan lines.

Rotary scanners typically provide either a fixed focus system or a manually adjustable focusing system. The former is the least expensive to implement, but assumes documents which are of relatively uniform thickness, since this can significantly affect the focus of the system. A manually adjustable system allows adjustment of the focus but often requires operators who have the skill to select a focus that will provide acceptable results for the document being scanned. This results in part because the optical head typically has a large numerical aperture for efficient collection of light but accordingly also has a shallow depth of field.

Skilled operators are commonly employed in connection with rotary drum scanners, since such scanners are frequently comparatively quite expensive and are commonly used in high volume, commercial production systems. However, the necessity for skilled operators is a drawback in connection with "low end" or moderately priced rotary drum scanners (e.g., under $10,000 at present prices), since such scanners are increasingly used by office personnel with limited or no training in scanner operation.

OBJECTS OF THE INVENTION

A. OBJECTS

Accordingly, it is an object of the invention to provide an improved focusing system for a rotary drum scanner.

Further, it is an object of the invention to provide an improved focusing system for a rotary drum scanner that is capable of setting the focus without operator intervention.

Still a further object of the invention is to provide an improved focusing system for a rotary drum scanner that is suitable for use in comparatively inexpensive scanners but that provides good focusing capabilities.

B. BRIEF DESCRIPTION OF THE INVENTION

In accordance with the present invention, an optical focusing system comprises a lens mounted for motion toward and away from a document on a drum and a controller for driving the lens. The controller receives a line of data from the document as the drum rotates and computes a focusing function from it by forming the squared difference between the value of each picture element (pixel) of the data line and the average of the values of the pixel and its neighboring pixels, weighted by the value of the entire line. This function is maximized by repeatedly moving the head toward or away from the drum, repeating the scan, and determining a new focusing function for each scan.

The head is moved in the same direction and by the same increment on each scan as long as the focusing function increases on successive scans. When the function decreases, the direction of movement is reversed, the magnitude of the increment decreased, and the cycle repeated until the focusing function changes by less than a defined amount on successive scans. The focusing is thus automatic and rapid; typically, focus is achieved within the time required to scan ten lines.

DETAILED DESCRIPTION OF THE INVENTION

Figure 1:
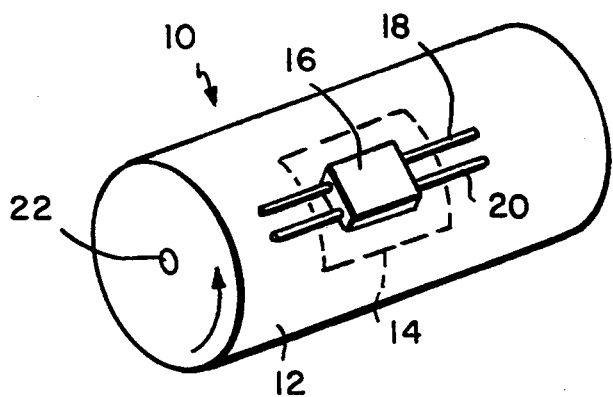

The foregoing and other and further objects and features of the invention will be more readily understood on reference to the following detailed description of the invention when taken in conjunction with the accompanying drawings in which:

In FIG. 1, a rotary drum scanner 10 has a drum 12 on which is mounted a document 14 that is to be scanned. An optical scan head 16 mounted on rails 18, 20 traverses the drum along the direction of its axis 22 while the drum rotates about this axis in order to scan the document line by line. A controller 24 receives data from the scan head 16 and provides control signals to it.

Figure 2:
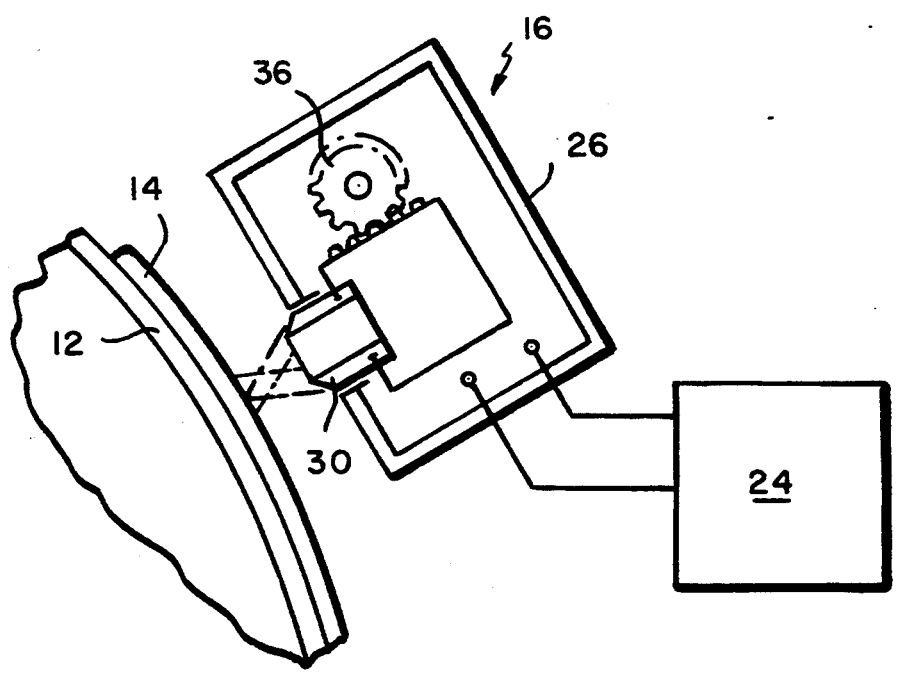

Turning now to FIG. 2, the optical head 16 has a lens 30 mounted on it for translation toward and away from the drum. To this end, the lens is mounted on a movable carriage 34 having a toothed face 34 which engages with a correspondingly toothed wheel 36 which, when rotated, moves the lens inwardly and outwardly from the head and thus away from or toward the document along the axis 38 in FIG. 2. The wheel 36 is driven from the controller 24.

Figure 3:
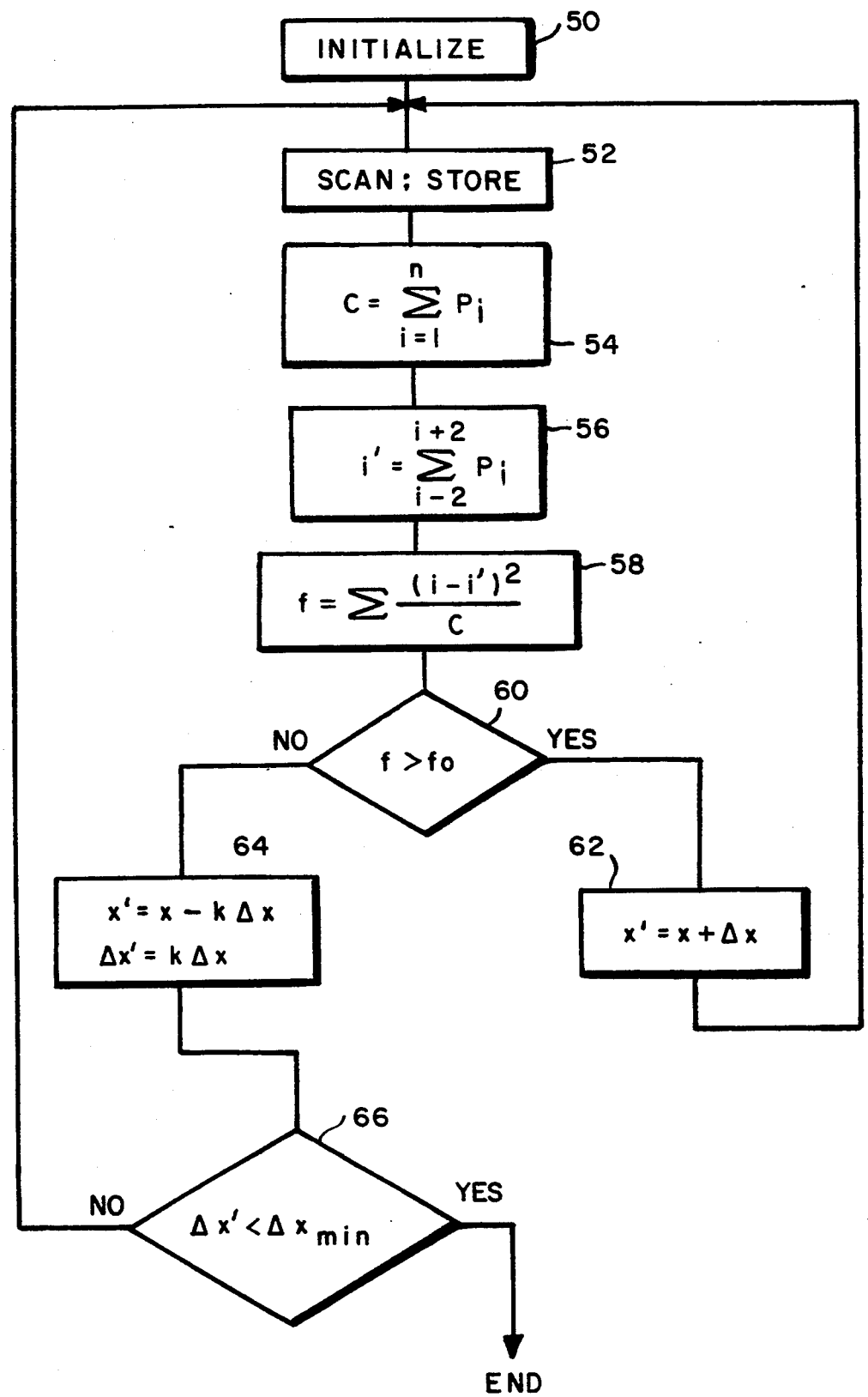

Considering now the flow diagram of FIG. 3, the system is initialized (block 50) by setting the lens position to a starting position and setting the value by which the lens position is to be moved during each focusing step to a starting value. Next, a line of the document is scanned pixel by pixel (52), and the resultant data is stored. Using this data, the magnitude of the illumination from each pixel is summed (54) to form a reference illumination level C for the line. For each pixel, an average of the values of the pixel and its neighbors is formed (56) and this average is used to compute the focusing function (58). This function is weighted by the reference illumination level C, since the magnitude of the illumination observed for a given line varies with the distance of the lens from the line.

The focus function f is then compared (60) with the previously computed focus function. On the first pass, this is the value that is set on initialization of the system. On subsequent passes, the prior value is the value of the immediately proceeding scan. If the value of the current focus function is greater than the prior value, the prior value is replaced by the current value (62) and the lens is moved to a new position which is equal to its prior position incremented by an amount Dx. The controller then begins another scan to determine if a better focus value can be found.

If, in contrast, the current value of the focus function is less than the prior value, the direction of motion of the lens is reversed by adding a negative increment to it (64). The magnitude of the increment is a factor of k times the current increment, where $k > 1$. For example, in one embodiment of the invention, a factor of $k = 3/2$ is used. The size of the current increment is then changed by a factor of m, where $m < 1$. For example, in the embodiment referred to, $m = \frac{1}{2}$. The controller then tests the size of the current increment (66) to insure that it is not less than a predefined minimum and, if it is not, returns to the beginning of the loop to scan another line with the new focus position and a new position increment. The controller repeatedly cycles the lens through the these steps until the new position increment is less than the predetermined minimum (66), at which point the desired focus has been found and the focusing procedure terminates. In practice, we have found that the system reaches focus in the time required to scan not more than ten lines.

We claim:

1. In a drum scanner, the improvement comprising apparatus for focusing a lens onto a document mounted on the drum, said apparatus comprising:
   A. means for scanning said document with an imaging element set to a first focal length to thereby form discrete pixel samples of at least a line thereof;
   B. means forming, for each pixel in said line, a moving average of said pixel and up to n neighboring pixels in said line, n equal to or greater than 1;
   C. means forming, for each pixel in said line, a pixel focus function comprising the magnitude of the difference between each said pixel and the moving average corresponding to said pixel;
   D. means for summing the focus function of each pixel to form a line focus function; and
   E. means for iteratively changing the focus of said imaging element and forming a new line focus function until a focal position corresponding to a defined tolerance about the maximum value of said line focus function is reached.

2. A drum scanner focusing system according to claim 1 which includes means for changing said focus by a first increment during successive iterations until said maximum value is reached and passed, and by smaller increments on subsequent iterations.

3. A drum scanner focusing system according to claim 2 which includes means for changing the direction of motion of said imaging element after passing the maximum value of said line function and thereafter moving in said changed direction by an amount greater than the first increment before again reversing direction and moving said imaging element by a smaller increment.

4. A drum scanner focusing system according to claim 1 including means for normalizing each line focus function with respect to the value of the pixel samples of said line.

5. A drum scanner focusing system according to claim 4 in which said magnitude is formed from the square of said difference.

6. A drum scanner focusing system according to claim 5 in which the moving average corresponding to a given pixel includes said pixel and its immediately adjacent pixels.

7. A drum scanner focusing system according to claim 5 in which the moving average corresponding to a given pixel includes said pixel and the two pixels on either side thereof.

* * * * *